US006763496B1

(12) United States Patent
Hennings et al.

(10) Patent No.: US 6,763,496 B1
(45) Date of Patent: Jul. 13, 2004

(54) METHOD FOR PROMOTING CONTEXTUAL INFORMATION TO DISPLAY PAGES CONTAINING HYPERLINKS

(75) Inventors: Eric Hennings, Seattle, WA (US); Michael A. Angiulo, Redmond, WA (US); Michael D. Smith, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/283,780

(22) Filed: Mar. 31, 1999

(51) Int. Cl.[7] ............................................. G06F 15/00
(52) U.S. Cl. .................... 715/501.1; 715/513; 715/526; 709/207; 709/224
(58) Field of Search ............................. 707/501.1, 530, 707/513, 514, 526; 715/513, 514, 526, 531, 501.1; 709/224, 207

(56) References Cited

U.S. PATENT DOCUMENTS

| | | | | |
|---|---|---|---|---|
| 5,572,643 A | * | 11/1996 | Judson | 709/218 |
| 5,761,683 A | | 6/1998 | Logan et al. | 707/513 |
| 5,793,966 A | | 8/1998 | Amstein et al. | 395/200.33 |
| 5,860,071 A | * | 1/1999 | Ball et al. | 707/100 |
| 5,907,851 A | * | 5/1999 | Yamakawa et al. | 707/540 |
| 5,935,210 A | * | 8/1999 | Stark | 709/224 |
| 6,031,989 A | * | 2/2000 | Cordell | 707/513 |
| 6,052,730 A | * | 4/2000 | Felciano et al. | 709/203 |
| 6,128,635 A | * | 10/2000 | Ikeno | 707/501.1 |
| 6,199,081 B1 | * | 3/2001 | Meyerzon et al. | 715/513 |
| 6,240,455 B1 | | 5/2001 | Kamasaka et al. | 709/229 |
| 6,253,204 B1 | | 6/2001 | Glass et al. | 707/102 |
| 6,321,242 B1 | | 11/2001 | Fogg et al. | 707/513 |
| 6,349,302 B1 | * | 2/2002 | Aoyama et al. | 707/101 |

* cited by examiner

Primary Examiner—Joseph Feild
Assistant Examiner—MaiKhanh Nguyen
(74) Attorney, Agent, or Firm—Ronald M. Anderson

(57) ABSTRACT

Contextual information concerning linked documents is promoted to display pages that contain hyperlinks to those documents. The contextual information can be immediately displayed, or it can be selectively displayed in response to a user selecting a text hyperlink anchor or a picture icon hyperlink anchor. Furthermore, the contextual information can include a variety of information about the linked document, including whether it has been modified within a predefined time period, such as the last 24 hours, a comment by the author concerning recent changes, and the size of the document. Preferably, the contextual information is automatically generated by a data promotion engine based on meta-data that is associated with the document and stored on a web site for the document. The contextual information may be either added to the document that corresponds to a display page at the time the document page is saved, or it may be dynamically uploaded to a browser when the display page is rendered by a browser. One of the types of contextual information stored in the meta-data is a manually defined category for a hyperlink in the display page.

30 Claims, 12 Drawing Sheets

```
10
   ┌─────────────────────────────────────────────────────────────────────┐
   │ DOCUMENT URL: HTTP://WWW.MICROSOFT.COM/FIGURE1.HTML                 │
   │                                                                     │
   │ <HTML>                                                              │
   │ <HEAD>                                                              │
   │ <TITLE>FIGURE 1</TITLE>                                             │
   │ </HEAD>                                                             │
   │ <BODY>                                                              │
12 │ THE NEXT LINE HAS THE BASE ELEMENT.                                 │
   │ <BASE HREF=HTTP://WWW.ACME.COM/PRESS/RELEASE1.HTML>                 │
14 │ THE NEXT LINE HAS A HYPERTEXT LINK WITH AN ABSOLUTE URL.            │
   │ <A HREF=HTTP://WWW.RESEARCH.COM/STATUS/REPORT.HTML>                 │
16 │ THE NEXT LINE HAS A HYPERTEXT LINK WITH A RELATIVE URL.             │
   │ <A HREF=RELEASE2.HTML>                                              │
   │ </BODY>                                                             │
   │ </HTML>                                                             │
18 │                                                                     │
   │ THE RELATIVE URL REFERS TO: HTTP://WWW.ACME.COM/PRESS/RELEASE2.HTML │
   └─────────────────────────────────────────────────────────────────────┘
```

*FIG. 1A*

```
20
   ┌─────────────────────────────────────────────────────────────────────┐
   │ DOCUMENT URL: HTTP://WWW.MICROSOFT.COM/FIGURE2.HTML                 │
   │                                                                     │
   │ <HTML>                                                              │
   │ <HEAD>                                                              │
   │ <TITLE>FIGURE 2</TITLE>                                             │
   │ </HEAD>                                                             │
   │ <BODY>                                                              │
   │ THIS DOCUMENT HAS NO BASE ELEMENT.                                  │
22 │ THE NEXT LINE HAS A HYPERTEXT LINK WITH AN ABSOLUTE URL.            │
   │ <A HREF=HTTP://WWW.RESEARCH.COM/STATUS/REPORT.HTML>                 │
24 │ THE NEXT LINE HAS A HYPERTEXT LINK WITH A RELATIVE URL.             │
   │ <A HREF=RELEASE2.HTML>                                              │
   │ </BODY>                                                             │
   │ </HTML>                                                             │
26 │                                                                     │
   │ THE RELATIVE URL REFERS TO: HTTP://WWW.MICROSOFT.COM/RELEASE2.HTML  │
   └─────────────────────────────────────────────────────────────────────┘
```

*FIG. 1B*

```
DOCUMENT URL: HTTP://WWW.TRAVELTICKETS.COM

<HTML>
<HEAD>
<TITLE>TRAVELTICKETS.COM</TITLE>        }— 200
</HEAD>

<BODY>
        THIS DISPLAYS THE COMPANY LOGO
<H1>IMG.SRC = "IMAGES/COLOGO.GIF" ALT = "[COMPANY LOGO]"
BORDER="0" WIDTH=200 HEIGHT=42 </H1>

THIS SECTION DISPLAYS THE PICTURE ICONS WITH HYPERLINKS
        THIS LINE HAS THE AIRPLANE ICON AND ITS HYPERLINK
<P><A HREF= "/AIRTRAVEL/AIRTRAVEL.HTML">
<IMG.SRC = "IMAGES\AIRPLANE.GIF" ALT = "[AIR TRAVEL]" BORDER="0"
WIDTH=60 HEIGHT=36></A></P>
        THIS LINE HAS THE SHIP ICON AND ITS HYPERLINK
<P><A HREF= "/CRUISES/CRUISES.HTML"><IMG.SRC = "IMAGES\SHIP.GIF"
ALT = "[CRUISES]" BORDER="0" WIDTH=50 HEIGHT=36 ></A></P>
        THIS LINE HAS THE TRAIN ICON AND ITS HYPERLINK
<P><A HREF= "/TRAINS/TRAINS.HTML"><IMG.SRC = "IMAGES\TRAIN.GIF"
ALT = "[TRAINS]" BORDER="0" WIDTH=45 HEIGHT=36 ></A></P>
        THIS LINE HAS THE BUS ICON AND ITS HYPERLINK
<P><A HREF= "/TOURS/TOURS.HTML"><IMG.SRC = "IMAGES\BUS.GIF"
ALT = "[TOURS]" BORDER="0" WIDTH=100 HEIGHT=36 ></A></P>

THIS SECTION DISPLAYS THE TEXT HYPERLINKS
                USING RELATIVE REFERENCES
<P><A HREF= "/AIRTRAVEL/AIRTRAVEL.HTML"> "AIR TRAVEL" </A></P>
<P><A HREF= "/CRUISES/CRUISES.HTML"> "CRUISES" </A></P>
<P><A HREF= "/TRAINS/TRAINS.HTML"> "TRAINS" </A></P>
<P><A HREF= "/TOURS/TOURS.HTML"> "TOURS" </A></P>

</BODY>
</HTML>
```

*FIG. 4*

METHOD FOR PROMOTING CONTEXTUAL INFORMATION TO DISPLAY PAGES CONTAINING HYPERLINKS

FIELD OF THE INVENTION

The present invention pertains to the use of hyperlinks on computer networks in general, and to the use of hyperlinks with embedded textual content, in particular.

BACKGROUND OF THE INVENTION

An on-line information system typically includes one or more computers (the servers) that makes information available so that other computers (the clients) can access the information. The server manages access to the information, which can be structured as a set of independent on-line services. A server and client communicate via messages conforming to a communication protocol that are sent over a communication channel, such as a computer network, or through a dial-up connection.

Typical uses for on-line services include document viewing, electronic commerce, directory lookup, on-line classified advertisements, reference services, electronic bulletin boards, document retrieval, electronic publishing, keyword searching of documents, technical support for products, and directories of on-line services. A service may make information available to clients free of charge, or for a fee, and may be on publicly accessible networks, such as the Internet, or on private networks.

Information sources managed by the server may include files, databases, and applications that execute on the server or on a client computer. The information that the server provides may simply be stored on the server, may be converted from other formats manually or automatically, may be computed on the server in response to a client request, may be derived from data and applications on the server or other machines, or may be derived by any combination of these techniques.

The user of an on-line service typically employs a browser program executed on the client to access the information managed by the on-line service. Possible user capabilities include viewing, searching, downloading, printing, editing, and filing the information managed by the server. The user may also price, purchase, rent, or reserve services or goods offered through an on-line service.

On-line services are available on the World Wide Web (WWW), which operates over the global Internet. The Internet is a wide area network (WAN) comprising a multitude of generally unrelated computer networks that are interconnected. Similar services are available on private networks called "Intranets" that may not be connected to the Internet, and through local area networks (LANs) and other WANs. The WWW and similar private network architectures provide a "web" of interconnected document objects, and these document objects are located at various sites. A more complete description of the WWW is provided in "The World-Wide Web," by T. Berners-Lee, R. Cailliau, A. Luotonen, H. F. Nielsen, and A. Secret, *Communications of the ACM,* 37 (8), pp. 76–82, August 1994, and in "World Wide Web: The Information Universe," by Berners-Lee, T., et al., in *Electronic Networking: Research, Applications and Policy,* Vol. 1, No. 2, Meckler, Westport, Conn., Spring 1992.

Among the types of document objects in an on-line service are documents and scripts. Documents that are published on the WWW are usually written in the Hypertext Markup Language (HTML). This language is described in *HyperText Markup Language Specification*—2.0, by T. Berners-Lee and D. Connolly, RFC 1866, proposed standard, November 1995, and in "World Wide Web & HTML," by Douglas C. McArthur, in *Dr. Dobbs Journal,* December 1994, pp. 18–20, 22, 24, 26 and 86. Many companies are also developing their own enhancements to HTML. HTML documents are generally static, that is, their contents do not change over time unless modified by a service developer or by the author. HTML documents can be created using programs such as Microsoft Corporation's FRONTPAGE™ web page development program, which are specifically designed for that purpose, or by executing a script file, and can include JAVA™ and/or ACTIVEX™ programming language code.

The HTML language is used for writing hypertext documents, which are more formally referred to as Standard Generalized Markup Language (SGML) documents that conform to a particular Document Type Definition (DTD). An HTML document includes a hierarchical set of markup elements; most elements have a start tag, followed by content, followed by an end tag. The content is a combination of text and nested markup elements. Tags, which are enclosed in angle brackets ('<' and '>'), indicate how the document is structured and how to display the document, as well as destinations and labels for hypertext links. There are tags for markup elements such as titles and headers, text attributes such as bold and italic, lists, paragraph boundaries, links to other documents or other parts of the same document, in-line graphic images, and tags for many other features.

The following lines of HTML briefly illustrate how the language is used:

Some words are <B>bold</B>, others are <I>italic</I>. Here we start a new paragraph.<P>Here's a link to the <A HREF="http://www.microsoft.com">Microsoft Corporation </A>homepage.

This sample document is a hypertext document because it contains a hypertext "link" (hyperlink) to another document, in the line that includes "HREF=." The format of this link is described below. A hypertext document may also have a link to other parts of the same document. Linked documents may generally be located anywhere on the Internet.

When a user is viewing the document with a client program called a Web browser (described below), the links are displayed as highlighted words or phrases. For example, using a Web browser, the sample document above might be displayed on the user's screen as follows:

Some words are bold, others are italic. Here we start a new paragraph.

Here's a link to the Microsoft Corporation homepage.

The highlighted words or phrases comprise the link's "anchor." In addition to displaying text, a picture icon may also be used as a hyperlink anchor and may be combined with a text block so that both serve as the hyperlink anchor.

In a Web browser, the link may be selected, for example, by clicking on the highlighted area with a mouse. Typically, the screen cursor changes shape and/or color when positioned on the hypertext anchor. Selecting a link will cause the associated document to be displayed. Thus, clicking on the highlighted text (underlined in the above example) reading "Microsoft Corporation" would retrieve and display the associated homepage for that entity.

The HTML language also provides a mechanism (the image or "IMG" element) that enables an HTML document to include by reference, an image, which is stored as a separate file. When the end user views the HTML document, the included image is displayed as part of the document, at the point where the image element reference occurred in the document.

Another kind of document object in a web page is a "script." A script is an executable program, or a set of commands stored in a file, that can be run by a server program called a Web server (described below) to produce an HTML document that is then returned to the Web browser. Typical script actions include running library routines or other applications to fetch information from a file or a database, or initiating a request to obtain information from another machine, or retrieving a document corresponding to a selected hypertext link. A script may be run on the Web server when, for example, the end user selects a particular hypertext link in the Web browser, or submits an HTML form request. Scripts are usually written by a service developer in an interpreted language such as Basic, Practical Extraction and Report Language (Perl), or Tool Control Language (Tcl) or one of the Unix operating system shell languages, but they also may be written in more complex programming languages such as "C" and then compiled to produce an executable program. Programming in Tcl is described in more detail in *Tcl and the Tk Toolkit*, by John K. Ousterhout, Addison-Wesley, Reading, Mass., USA, 1994. Perl is described in more detail in *Programming in Perl*, by Larry Wall and Randal L. Schwartz, O'Reilly & Associates, Inc., Sebastopol, Calif., USA, 1992. JAVA and ACTIVEX programs are also frequently employed in web pages to implement various tasks.

Each document object in a web has an identifier called a Universal Resource Identifier (URI). These identifiers are described in more detail in T. Berners-Lee, *"Universal Resource Identifiers in WWW: A Unifying Syntax for the Expression of Names and Addresses of Objects on the Network as used in the World-Wide Web,"* RFC 1630, CERN, June 1994; and T. Berners-Lee, L. Masinter, and M. McCahill, *"Uniform Resource Locators (URL),"* RFC 1738, CERN, Xerox PARC, University of Minnesota, December 1994. A URI allows any object on the Internet to be referred to by name or address, such as in a link in an HTML document as shown above. There are two types of URIs: a Universal Resource Name (URN), and a Uniform Resource Locator (URL). A URN references an object by name within a given name space. A URL references an object by defining an access algorithm using network protocols. An example of a URL is "http:flwww.microsoft.com". A URL has the syntax "scheme://host:port/path?search" where:

"scheme" identifies the access protocol (such as HTTP, FTP, or GOPHER);

"host" is the Internet domain name of the machine that supports the protocol and comprises the fully qualified domain name of a network host, or its IP address written as a set of four decimal digit groups separated by periods. Fully qualified domain names take the form of a sequence of domain labels separated by periods, each domain label starting and ending with an alphanumerical character and possibly also containing "-" characters. The rightmost domain label will never start with a digit, though, which syntactically distinguishes all domain names from the IP addresses (See Section 3.5 of RFC 1034 and Section 2.1 of RFC 1123).

"port" is the transmission control protocol (TCP) port number of the appropriate server (if different from the default);

"path" is a scheme specific identification of the object. It supplies the details of how the specified resource can be accessed. Note that the "/" between the host (or port) and the path is NOT part of the path; and "search" contains optional parameters for querying the content of the object.

URLs are also used by web servers and browsers on private computer systems, Intranets, or networks, and not just for the WWW. The HTTP URL scheme is used to designate Internet resources that may be accessed using HTTP, and an HTTP URL has the syntax "http://<host>:<port>/<path>?<searchpart>", where <host> and <port> are as described above. If :<port> is omitted, the port defaults to 80. No user name or password is allowed; <path> is an HTTP selector, and <searchpart> is a query string. The <path> is optional, as is the <searchpart> and its preceding "?". If neither <path> nor <searchpart> is present, the "/" may also be omitted. Within the <path> and <searchpart> components, "/", ";", "?" are reserved. The "/" character may be used within HTTP to designate a hierarchical structure.

There are generally two types of URLs that may be used in the hypertext link: absolute URLs, and relative URLs. An absolute URL includes a protocol identifier, a machine name, and an optional HTTP port number. A relative URL does not include a protocol identifier, machine name or port, and must be interpreted relative to some known absolute URL called the base URL. The base URL is used to determine the protocol identifier, machine name, optional port, and base directory for a relative URL. For further discussion of URL format and usage, see the document "Uniform Resource Locators," Internet Request for Comments (RFC) 1738, by T. Berners-Lee, L. Masinter, M. McCahill, University of Minnesota, December 1994. For further discussions of relative URL format and usage, see "Relative Uniform Resource Locators," RFC 1808, by R. Fielding, University of California, Irvine, June 1995.

A hypertext link to an electronic document is specified by one of several HTML elements. One of the parameters of an HTML element for a hypertext link is the URL that serves as the identifier for the target of the link. An HTML document may have a base element defining an absolute URL that specifies the base URL for that document. If the document has no base element, then the absolute URL of the document is used as the base URL. The base element provides a base address for interpreting relative URLs when the document is read out of context.

For example, FIG. 1A shows text having a document URL 10, a base element 12, a hypertext link with an absolute URL 14, and a hypertext link with a relative URL 16, which is evaluated with respect to base URL 12 to produce a resulting URL 18. As an additional example, FIG. 1B shows text having a document URL 20, no base element, a hypertext link with an absolute URL 22, and a hypertext link with a relative URL 24, which is evaluated with respect to document URL 20 to produce a resulting URL 26.

A site at which documents are made available to network users is called a "Web site" and must run a "Web server" program to provide access to the documents. A Web server program is a computer program that allows a computer on the network to make documents available to the rest of the WWW or a private network. The documents are often hypertext documents in the HTML language, but may be other types of document objects as well, and may include images, audio, and/or video information. The information that is managed by the Web server includes hypertext documents that are stored on the server or are dynamically generated by scripts on the Web server. Several Web server software packages exist, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Corporation SPARC II™ workstation running the Unix operating system, and personal computers with the Intel PENTIUM™ processor running the Microsoft MS-DOS™ operating system and the Microsoft WINDOWS™ graphic user interface operating environment.

Web servers also have a standard interface for running external programs, called the Common Gateway Interface (CGI). CGI is described in more detail in *How to Set Up and Maintain a Web Site,* by Lincoln D. Stein, Addison-Wesley, August 1995. A gateway is a program that handles incoming information requests and returns the appropriate document or generates a document dynamically. For example, a gateway might receive queries, look up the answer in a database to provide a response, and translate the response into a page of HTML so that the server can send the response to the client. A gateway program may be written in a language such as "C" or in a scripting language such as Perl or Tcl or one of the Unix operating system shell languages. The CGI standard specifies how the script or application receives input and parameters, and specifies how output should be formatted and returned to the server.

For security reasons, a Web server machine may limit access to files. To control access to files on the Web server, the Web server program running on the server machine may provide an extra layer of security above and beyond the normal file system and login security procedures of the operating system on the server machine. Access to the on-line service document objects via a network file system would not conform to the security features of the Web server program and would provide a way to access documents outside of the security provided by the Web server. The Web server program also typically maps document object names that are known to the client to file names on the server file system. This mapping may be arbitrarily complex, and any author or program that tries to access documents on the Web server directly would need to understand this name mapping.

A user (typically using a computer other than the Web server) who wishes to access documents available on the network at a Web site must run a Web browser. The combination of the Web server and Web browser communicating over a computer network using an HTTP protocol is referred to herein as a "web architecture." The Web browser program allows the user to retrieve and display documents from Web servers. Some of the popular Web browser programs are: NAVIGATOR™ browser from NetScape Communications Corp. of Mountain View, Calif.; MOSAIC™ browser from the National Center for Supercomputing Applications (NCSA); WINWEB™ browser, from Microelectronics and Computer Technology Corp. of Austin, Tex.; and Internet Explorer from Microsoft Corporation of Redmond, Wash. Web browsers have been developed to run on different platforms, including personal computers with the Intel Corporation PENTIUM™ processor running Microsoft Corporation's MS-DOS™ operating system and Microsoft Corporation's WINDOWS™ graphic user interface operating system environment, and Apple Corporation's MACINTOSH™ personal computers, as well as various UNIX™ operating system platforms.

The Web server and the Web browser communicate using the Hypertext Transfer Protocol (HTTP) message protocol and the underlying transmission control protocol/Internet protocol (TCP/IP) data transport protocol of the Internet. HTTP is described in *Hypertext Transfer Protocol—HTTP/ 1.0,* by T. Berners-Lee, R. T. Fielding, H. Frystyk Nielsen, Internet Draft Document, Oct. 14, 1995. In HTTP, the Web browser establishes a connection to a Web server and sends an HTTP request message to the server. In response to an HTTP request message, the Web server checks for authorization, performs any requested action, and returns an HTTP response message containing an HTML document in accord with the requested action, or an error message. The returned HTML document may simply be a file stored on the Web server, or may be created dynamically using a script called in response to the HTTP request message. For instance, to retrieve a document, a Web browser may send an HTTP request message to the indicated Web server, requesting a document by reference to the URL of the document. The Web server then retrieves the document and returns it in an HTTP response message to the Web browser. If the document has hypertext links, then the user may again select one of the links to request that a new document be retrieved and displayed. As another example, a user may fill in a form requesting a database search. In response, the Web browser will send an HTTP request message to the Web server including the name of the database to be searched, the search parameters, and the URL of the search script. The Web server calls a search program, passing in the search parameters. The program examines the parameters and attempts to answer the query, perhaps by sending the query to a database interface. When the program receives the results of the query, it constructs an HTML document that is returned to the Web server, which then sends it to the Web browser in an HTTP response message.

Request messages in HTTP contain a "method name" indicating the type of action to be performed by the server, a URL indicating a target object (either document or script) on the Web server, and other control information. Response messages contain a status line, server information, and possible data content. The Multipurpose Internet Mail Extensions (MIME) specification defines a standardized protocol for describing the content of messages that are passed over a network. HTTP request and response messages use MIME header lines to indicate the format of the message. MIME is described in more detail in *MIME (Multipurpose Internet Mail Extensions): Mechanisms for Specifying and Describing the Format of Internet Message Bodies,* Internet RFC 1341, June 1992.

As discussed above, a user typically views documents on the Internet with a web browser. The web browser is able to distinguish hyperlinks from other HTML content, which allows the browser to highlight the hyperlink anchors and/or change the cursor shape and/or color to inform the user that the underlying text or graphic is a hyperlink. The user can navigate a site or the web by simply clicking on various hyperlink anchors.

Although hyperlinks are a necessary and valuable feature, they only provide limited information to the user. For instance, the only component the user sees is the hyperlink anchor display text or the picture icon. In some cases, there is other descriptive text that is posted in proximity to the hyperlink or picture icon, such as the text a user sees below hyperlinks on a search report page issued by an Internet search engine. This additional descriptive text must be either be encoded into the HTML document (as is the case for most web pages), or be dynamically generated with an HTML script (as is true for search engine pages). In either case, the descriptive text is not inherently tied to the hyperlink.

To ensure that users return on a regular basis, it is desirable to provide changes in the content on web sites. A user may visit one or more favorite sites on a periodic basis, hoping to find new content. In most instances, a hyperlink to a changed resource (e.g., a web page) and any associated descriptive text displayed adjacent to the hyperlink (or part of a hyperlink picture icon) provide little or no indication that the resource has changed, and do not indicate when the most recent change occurred. If this information does exist, it must be generated by the author of the page containing the hyperlink, or the web site administrator. Even in the case of search page results, the information provided by a search engine is often out of date because the web page database the search engine uses was compiled before a change occurred.

It would be desirable to provide other information to a user before the user selects a hyperlink to access a linked resource. For instance, the linked resource might be a large document that can be very time consuming to download, especially over a slow connection. It is common for users to click on hyperlinks to ascertain the content of the document the hyperlink is mapped to, without knowing the size of the document. If the user unknowingly picks a large document, the resulting wait time often causes the user to stop the download of the document without ever viewing it, which results in a waste of both the user's time and network bandwidth.

Thus, it would be advantageous for a user to be able to view contextual information concerning a linked document or other resource, such as its size, recent edits, etc., so that the user can decide whether to view the document before selecting the link. This feature would enable the user to find desired web page content more efficiently and avoid downloading content that is not desired. In addition, this type of contextual information would be advantageous to web site developers and administrators, since it would provide information concerning changes that are made to the documents on a site, indicate who made the changes, and provide other information that might be of interest to a developer or administrator.

SUMMARY OF THE INVENTION

The present invention addresses many of the foregoing problems associated with conventional hyperlink identifiers by providing a system and related method for adding contextual information pertaining to one or more linked documents, to display pages that contain hyperlinks to the linked documents. The contextual information can be immediately displayed when a page is opened, or it can be dynamically displayed based on a user interacting with a text hyperlink anchor or picture icon hyperlink anchor. The contextual information on a display page can assist a user in deciding whether to view the linked document. A variety of information about the linked document can be displayed, including whether the linked document has been modified within a predetermined time period, an author's comments concerning any recent changes to the linked document, and the size of the document. In addition, the contextual information can be tailored to individual users. For instance, history information stored in a user's browser concerning the times and dates a user visits a site can be used to formulate user-specific contextual information that is displayed on the browser, for example, as an icon that indicates a page referenced by the history information has been changed since the user last visited it. The system and method are preferably implemented as part of a web page authoring program.

The framework for adding the contextual information is provided by multiple contextual information files, each of which contains a set of "meta-data" entries. Preferably, in the meta-data, there is one contextual information file associated with each document that is stored on the web site server. The meta-data entries include various parameters concerning the associated document, such as time and date of last modification, author, the document's size, etc. The meta-data may also include an author's comments concerning recent changes, as well as other information that an author of a linked document provides. Preferably, the meta-data additionally comprise a list of back linked documents— that is, referring documents on the web site that contain a hyperlink to the document. The back link information is used by a data promotion engine to automatically promote the contextual information to display pages that correspond to the back linked documents.

According to a first aspect of the invention, a method is disclosed for promoting contextual information associated with a linked document to a display page that contains a hyperlink to the linked document. When an author edits and saves the linked document, one or more of the meta-data entries associated with the linked document are updated, so that the contextual information for the display page can be determined. The data promotion engine then generates instructions corresponding to the display of the contextual information so that the display page will include the contextual information when the page is rendered by a browser. The instructions can either be added to the referring document at the time the linked document is saved, or else the instructions can be added to the HTML content of the referring document when it is uploaded from the web site server to a browser at render time. The instructions preferably are HTML code and may include JAVA and/or ACTIVEX script.

According to another aspect of the invention, contextual information concerning a nested document can be added to a display page that contains a hyperlink to a linked intermediate document, which, in turn, contains a hyperlink to the nested document. The nested document has an associated contextual information file containing meta-data entries that include a back link to the intermediate document. Likewise, the intermediate document has an associated contextual information file containing meta-data entries that include a back link to the display page document. The data promotion engine recursively follows these back links to determine that the contextual information instructions that it generates corresponding to the nested page can be added to the display page document. The display page may include contextual information for both the nested document and the intermediate document.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1A is a sample HTML document having a base URL, and including both a hyperlink using a relative URL and a hyperlink using an absolute URL;

FIG. 1B is a sample HTML document that does not have a base URL, but including a hyperlink using a relative URL and a hyperlink using an absolute URL;

FIG. 4 is an HTML document that corresponds to the homepage of the web site of FIG. 2;

DESCRIPTION OF THE PREFERRED EMBODIMENT

Figure 2:
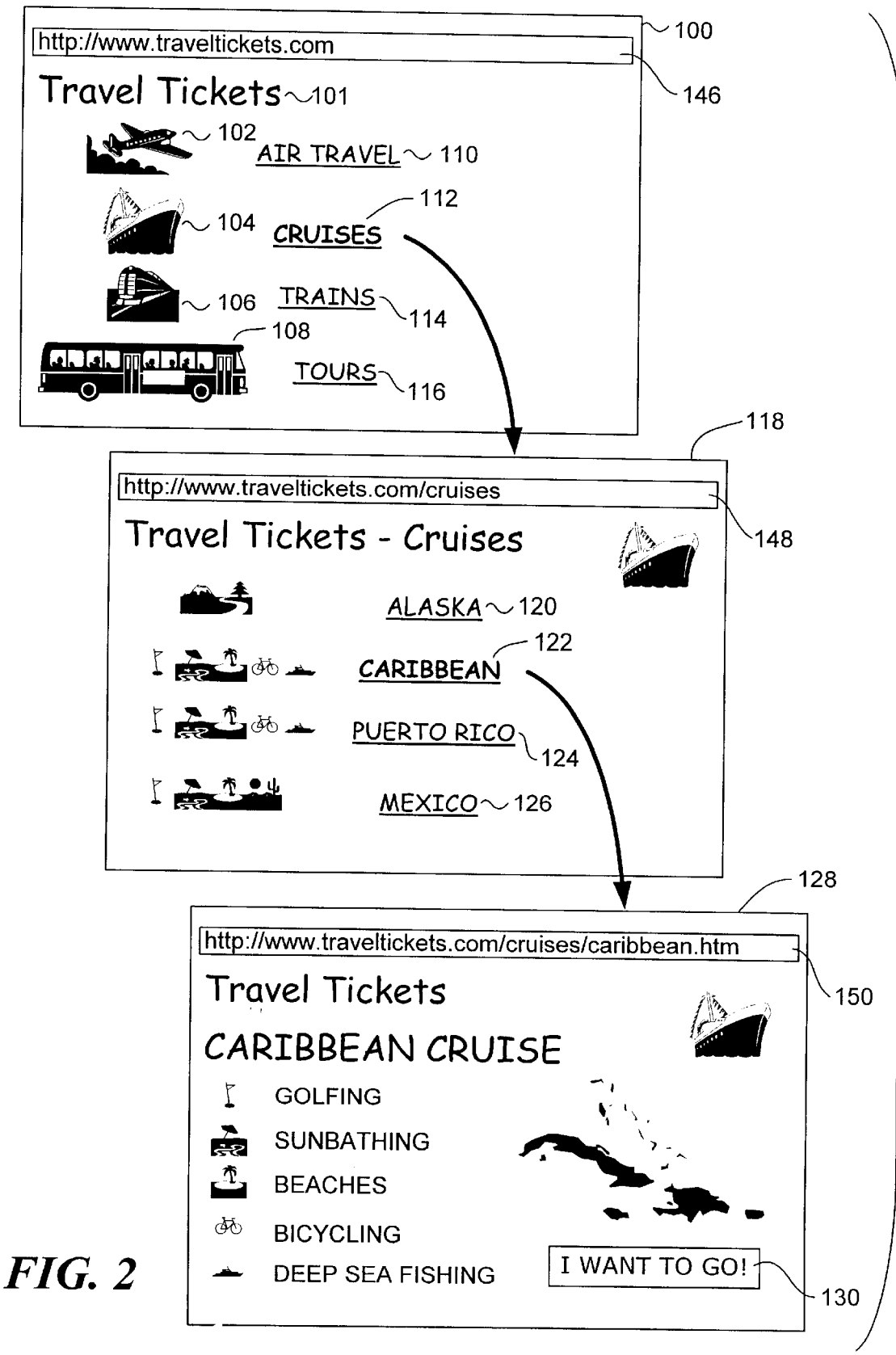
FIG. 2 illustrates a homepage, a Cruises page, and a Caribbean cruise page that are linked to one another on an exemplary travel agency web site.

FIG. 2 shows three web pages from an exemplary travel agency web site called Travel Tickets, which has the URL "www.traveltickets.com." The site's homepage 100, which is the first page a user will usually see when visiting the site, includes a company logo 101, and several picture icons 102, 104, 106, and 108 that correspond to various categories of travel offerings available at the site. Adjacent to the picture icons and paired thereto are text hyperlink anchors 110, 112, 114, and 116.

As discussed above, Internet web sites typically comprise multiple HTML documents that are stored on a web server. The pages (documents) for a web site are generally organized in a structured hierarchy based on content level. In the example shown in FIG. 2, homepage 100 is at the top level of the content hierarchy, and there is a "nested" page for each of the travel categories that can be reached by either clicking one of the picture icons or one of the associated text hyperlink anchors. For instance, clicking on either icon 104 or text hyperlink anchor 112 will link the browser to Cruises page 118, causing the Cruises page to open in the browser. The Cruises page, and the pages associated with the other travel categories (e.g., Air Travel page, Trains page, etc., (not shown)) are all nested at a second level of the content hierarchy. As with the homepage 100, Cruises page 118 also contains hyperlinks pointing to pages that are nested below it, including "Alaska" hyperlink 120, "Caribbean" hyperlink 122, "Puerto Rico" hyperlink 124, and "Mexico" hyperlink 126. Each of these hyperlinks can be used to locate a page at a third level of the content hierarchy. For instance, clicking on "Caribbean" hyperlink 122 will link the browser to a Caribbean Cruise page 128, which contains detailed information about a Caribbean cruise for which the user can purchase tickets at the web site. There are similarly nested detailed information pages for the other cruise destinations (Alaska, Puerto Rico, Mexico—none shown).

Clicking on an "I Want to Go!" button 130 causes the browser to open a ticket reservation page (not shown), containing travel dates, accommodation options, pricing information, payment information, etc. Since the same ticket reservation page can be accessed from the other third level pages (e.g., from the Mexico Cruise page), the ticket reservation page is not nested below the third level pages, but instead, is located below the homepage on the second level of the content hierarchy. Although not shown, homepage 100 may also contain a hyperlink to the ticket reservation page.

Figure 3A:
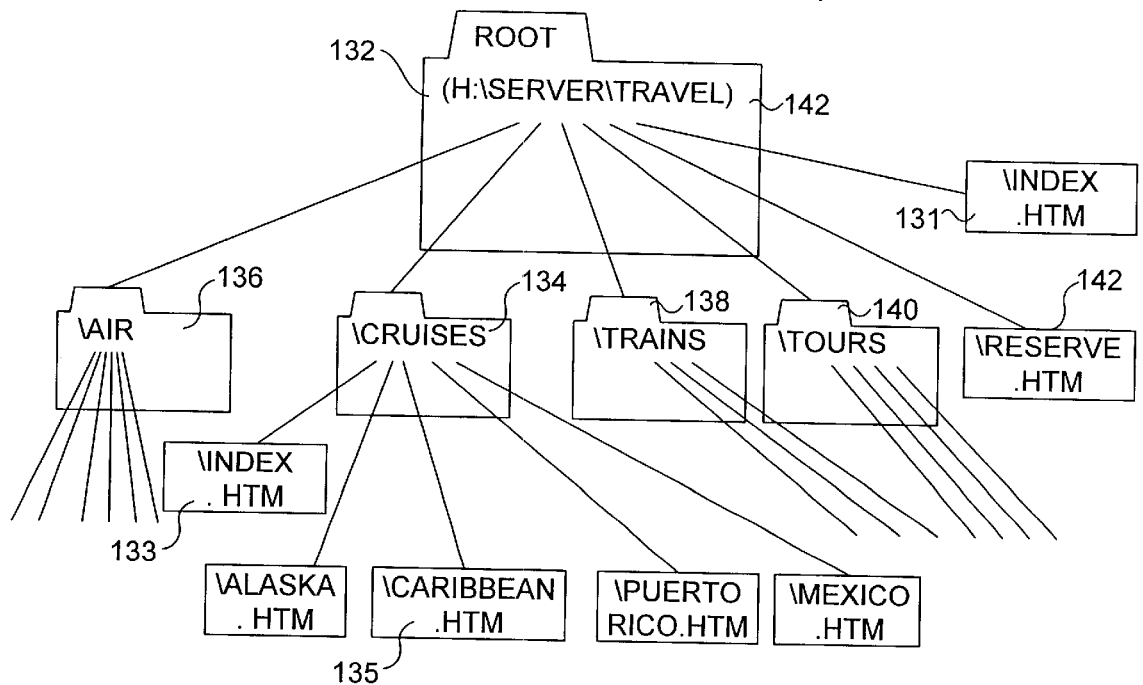
FIG. 3A illustrates the file structure of the documents that comprise the web site of FIG. 2.

Each of the pages (documents) on a web site is typically stored as an individual HTML file on the web site's server, in a file hierarchy that is similar in structure to the content hierarchy. Such a file hierarchy is shown in FIG. 3A. All of the documents are generally stored in a root directory folder, or in subfolders. For example, the HTML files for the travel agency site are stored in a root folder 132 located on the server at "H:\server\travel". The HTML homepage document is commonly stored on the web server in the root folder, and generally has a special name such as "index.htm" or "default.htm" so that the web server can identify it as the homepage document. The specific name applied to the homepage document depends on the type of server used for the web site. For instance, a homepage document 131 for the travel agency site is stored in root folder 132 as "index.htm." The HTML documents that correspond to the nested web pages are typically located in subdirectories (subfolders) that are nested at one or more levels below the root directory. For example, an "index.htm" HTML document 133 corresponding to the Cruises page is stored in a cruises subfolder 134 (i.e., stored on the server as "H:\server\travel\cruises\index.html"), as well as a "caribbean.htm" HTML document 135 corresponding to the Caribbean Cruise page (i.e., stored on the server as "H:\server\travel\cruises\caribbean.htm"). There are additional subfolders corresponding to the different travel categories, including an Air Travel subfolder 136, a trains subfolder 138, and a tours subfolder 140. Each of subfolders 134, 136, 138, and 140 contains one or more HTML documents corresponding to the content hierarchy of the site.

Figure 3B:
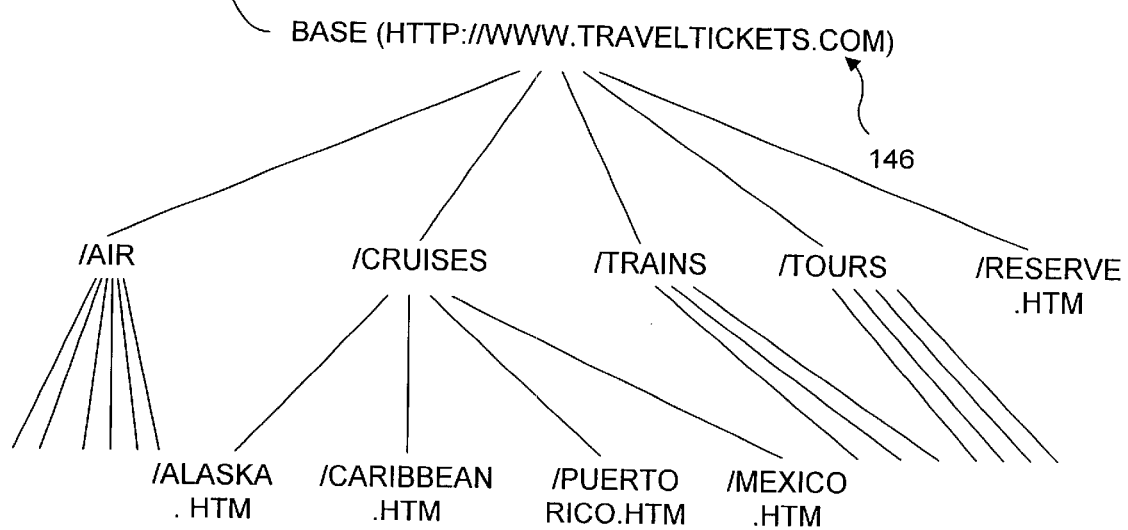
FIG. 3B illustrates the URL structure of the web site shown in FIG. 2.

FIG. 3B illustrates a URL structure corresponding to the HTML document file structure shown in FIG. 3A. It is common for a web site's URL structure to parallel the file structure of the HTML documents for that site, in what is known as a relative URL reference scheme, as discussed above. This scheme makes creating and changing URLs for a site very easy. When using this scheme, the URL references generally contain a <path> portion that matches the path of its corresponding HTML file relative to the root directory of the site. Note that the elements of both figures are nearly identical, with a few exceptions. One exception is that the file structure starts with a root address 142 at its top, while the URL structure starts with a URL base 144 at its top. Another exception is that both "index.htm" HTML documents 131 and 133 are referenced by their indexed source and seem to "disappear" into the hierarchy. Actually, "index.htm" HTML document 131 corresponds to homepage 100, and therefore its URL is the URL for the web site (http://www.traveltickets.com). Similarly, "index.htm" HTML document 133 corresponding to the Cruises page 118 is referenced by the URL "http://www.traveltickets.com/cruises"—it has "disappeared" into the "/cruises" portion of the structure. The URL base 144 is simply "http://<host>," wherein <host> is the domain name of the site's server. The travel agency example web pages shown in FIG. 2 contain URLs that follow this scheme, including a URL 146, corresponding to the homepage, a URL 148, corresponding to the Cruises page, and a URL 150, corresponding to the Caribbean Cruise page.

As discussed above, Internet web browsers translate the HTML content of web page documents in order to display web pages. FIG. 4 shows an example of an HTML document that corresponds to homepage 100 of FIG. 2. The HTML document contains a variety of markup and tag elements that are retrieved and interpreted by the web browser, resulting in a display page that is similar to homepage 100. The document includes a head section 200, and a body section 202. Most of the content of an HTML document is included in the body section.

The top portion of body section 202 contains the HTML code to display the picture icons 102, 104, 106, and 108, and embed their associated hyperlinks. For instance, a markup 204 indicates that an image source 206 of the cruise ship icon is a GIF file located at [root\]Images\ship.gif. (the "H:\server\travel" portion is not included due to the use of a relative addressing scheme). Markup 204 also includes a hyperlink reference 208 to the Cruises page.

The next portion of the body section 202 contains a list of text hyperlink markups 210 and associated text anchors. For example, a hyperlink markup 212 comprises a relative URL reference 214 of "\Cruises\Cruises.html" and a text anchor 216 of "Cruises."

The web browser translates the HTML code from top to bottom, displaying the markup elements sequentially. Many newer browsers provide a feature that displays a placeholder for each picture icon while the file for the icon is downloaded, thereby allowing the textual markup elements to be displayed first. This technique enables a user to click on a hyperlink within the display page while the picture icon graphic content is still being downloaded.

The present invention enhances conventional hyperlinks by displaying contextual information pertaining to a hyperlink's resource (e.g., a linked page) in proximity to and associated with the hyperlink's anchor. In order to provide this functionality, the present invention uses a low overhead scheme for storing contextual information for a linked resource and forwarding the contextual information to back linked display pages that contain a hyperlink to the resource. The contextual information for a given resource is stored in a file associated with that resource. The file comprises a set of "meta-data" that concerns parameters relating to the resource, such as the last time the resource was modified, the author's name, the size of the resource, and almost any other information that may be of interest to a user.

Figure 3C:
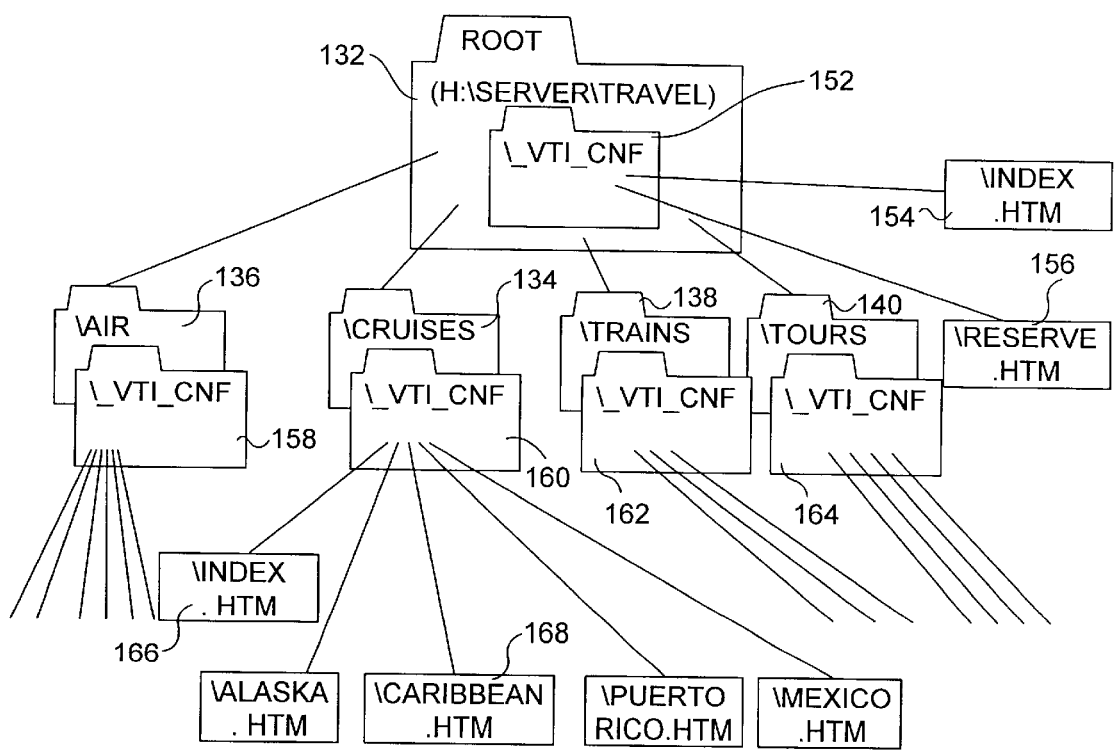
FIG. 3C illustrates the file structure of the contextual information files for the web site of FIG. 2.

FIG. 3C shows the file structure hierarchy for the contextual information (meta-data) files corresponding to the travel agency web site. The file structure shown here is an example of one of many ways the files could be stored. The files could be stored in a variety of different databases, using various formats, as part of the file system of the web-site server. The contextual information files are stored in subfolders called _vti_cnf subfolders within the same folders as the HTML documents to which they correspond, wherein each contextual information file shares the same name as its corresponding HTML document. For example, root folder 132 contains a _vti_cnf subfolder 152, which contains an "index.htm" contextual information file 154 that corresponds to "index.htm" (homepage) HTML file 131. This _vti_cnf subfolder contains additional contextual information files for corresponding HTML documents that are located in root folder 132, such as a "reserve.htm" contextual information file 156 for a "\reserve.htm" file 142 (in FIG. 3A).

In a similar manner, each subfolder in the HTML file hierarchy includes a _vti_cnf subfolder containing contextual information files that correspond to the HTML files in that HTML document subfolder, including a _vti_cnf subfolder 158 (corresponding to Air Travel subfolder 136), a _vti_cnf subfolder 160 (corresponding to Cruises subfolder 134), a _vti_cnf subfolder 162 (corresponding to Trains subfolder 138), and a _vti_cnf subfolder 164 (corresponding to Tours subfolder 140). These _vti_cnf subfolders 158, 160, 162, and 164 each contain one or more contextual information files corresponding to the HTML documents in their parent folder or subfolder. For example, _vti_cnf subfolder 160 contains an "index.htm" contextual information file 166 corresponding to "index.htm" HTML document 133, and a "caribbean.htm" contextual information file 168 corresponding to "caribbean.htm" HTML document 135. These files, along with the file hierarchy of the web site documents, comprise a "database" for the web site.

An example of a contextual information file is shown below. This example file corresponds to Cruises page 118 of the travel agency web site example of FIG. 2, and is stored in "index.htm" contextual information file 166.

\cruises\_vti_cnf\index.htm
1. vti_encoding:SR|utf8-nl
2. vti_author:SR|mdsmith
3. vti_modifiedby:SR|mdsmith
4. vti_timecreated:TR|02 Feb 1999 20:22:53-0000
5. vti_timelastmodified:TR|02 Feb 1999 20:22:53-0000
6. vti_cacheddtm:TX|02 Feb 1999 20:22:53-0000
7. vti_filesize:IR|358
8. vti_cachedlinkinfo:VX|
9. vti_cachedsvcrellinks:VX|
10. vti_cachedtitle:SR|Cruises page
11. vti_title:SR|Cruises page
12. vti_cachedbodystyle:SR|<BODY>
13. vti_cachedhasbots:BR|false
14. vti_cachedhastheme: BR|false
15. vti_cachedhasborder:BR|false
16. vti_metatags:VR|HTTP-EQUIV=Content-Language en-us HTTP-
17. EQUIV=Content-Type text/html;\\charset=windows-1252 GENERATOR
18. Microsoft\\FrontPage\\4.0ProgId FrontPage.Editor.Document
19. vti_progid:SR|FrontPage.Editor.Document
20. vti_generator:SR|Microsoft FrontPage 4.0
21. vti_extenderversion:SR|4.0.2.2505
22. vti_back link information:VX|. .\Index.htm
23. vti_comments:VX|"New Cruises to Mexico"

The meta-data entries in the above example include the author's name (line 2), the name of the person who made the last modification to the document (line 3), the data and time the document was last modified (line 5) and the size of the document (line 7). The meta-data entries also include an author's comment (line 23). In addition, there may be one or more back link entries (line 22) that are used for updating information in documents that contain hyperlinks to the document to which the meta-data relates (as described below). In addition to the entries shown, the meta-data may also comprise other information, including the language of the document, and a summary of changes; however, it is not intended that the information provided in the meta-data in any way be limited by the example set forth herein, since it will be evident that almost any information related to a web page may be included.

Figure 5:
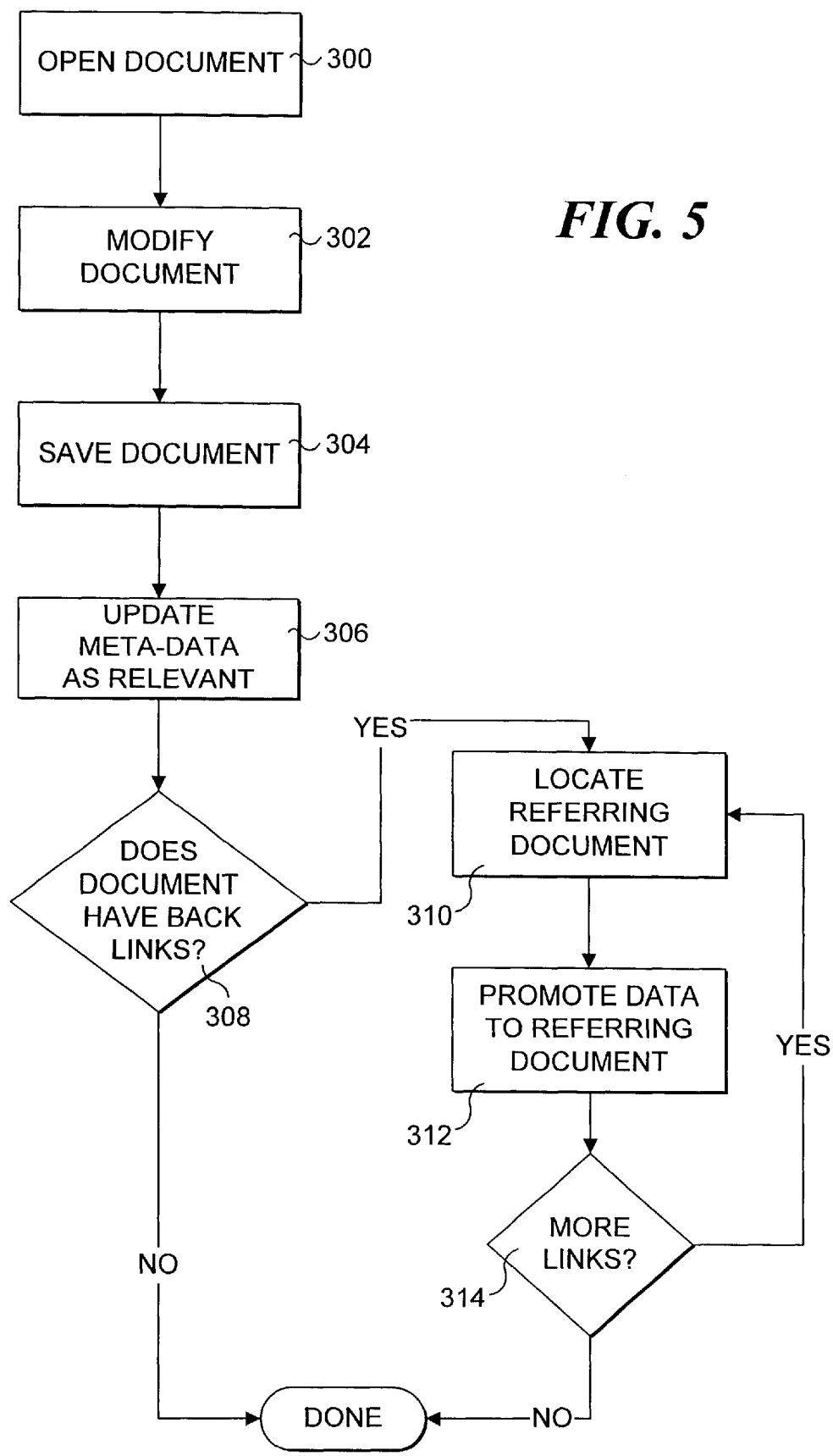
FIG. 5 is a flow diagram illustrating the steps executed by a preferred embodiment of the present invention to create and/or modify contextual information and insert such information into web site documents.

As shown in FIG. 5, the process of creating and/or modifying meta-data entries is initiated when an author opens a new or existing HTML document in a block 300, and the document is modified in a block 302 and saved in a block 304. Upon saving the document, the meta-data for the document is created (if the document is new), or updated, as relevant, in a block 306. This step creates new meta-data entries for new documents, or updates meta-data entries for previously existing documents. The author may also add new meta-data information when editing a document, such as providing comments concerning the changes. The meta-data entries are made to the contextual information file that corresponds to the HTML document being edited.

It is desirable to add the contextual information to the hyperlinks that refer to the HTML document being edited. Thus, the logic flows to a decision block 308, where a determination is made as to whether the document has any back links. A back link identifies the location of another document (called a referring document) on the web site that contains a hyperlink to the edited HTML document. For instance, the "\cruises\index.htm" contextual information file shown above (corresponding to Cruises page 118) contains a back link information entry in line 22 that indicates traveltickets.com homepage 100 (i.e. root\index.htm) contains a hyperlink to Cruises page 118.

Each referring document is then located in a block 310, and display code for any relevant contextual information based on consideration of the meta-data is promoted (i.e., added) to the referring document in a block 312. The contextual information display code is added with a data promotion engine, as discussed in detail below. A decision block 314 determines if there are any additional back links within the referring document, and if there are, the back linked document (i.e., referring document) is again located and the data promotion step is repeated until there are no more referring documents.

Figure 6:
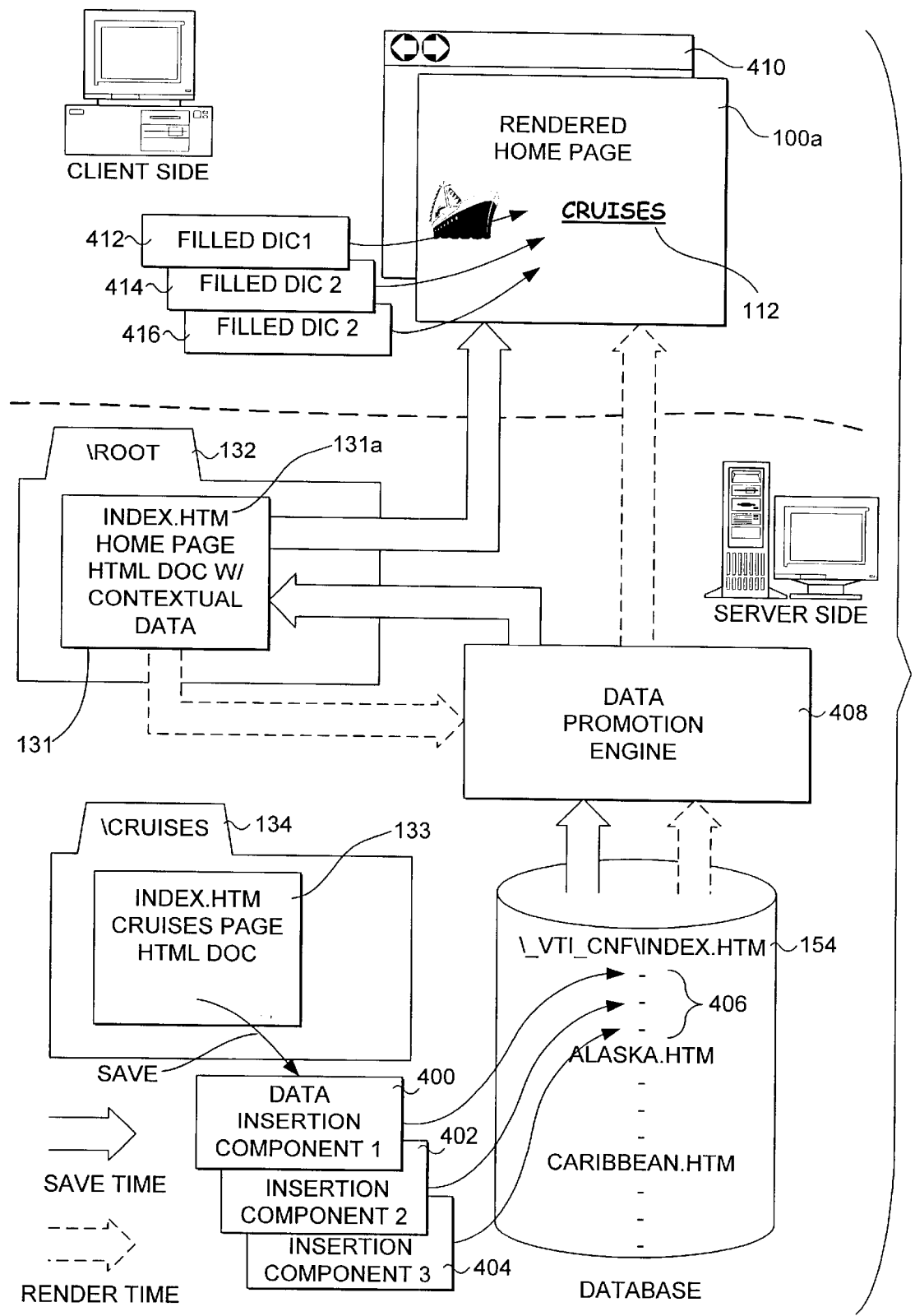
FIG. 6 is a diagram illustrating the process that occurs when contextual information is promoted to a display page or its underlying document.

FIG. 6 illustrates two schemes for promoting data to a referring document: a "save time" scheme and a "render time" scheme. Both schemes are performed on the web server side of the client-server environment. In both schemes, the contextual information, shown here as data insertion components (DICs) 400, 402, and 404, is saved in the HTML document's corresponding contextual information file. For instance, suppose that "index.htm" HTML file 133 in Cruises subfolder 134 has just been edited and saved. As a result, meta-data entries 406, corresponding to DICs 400, 402, and 404, are added to (or modified in) "index.htm" contextual information file 154.

At this point the schemes differ. Under the "save time" scheme, a data promotion engine 408 augments the back linked files by adding HTML code corresponding to the display of the contextual information for the recently saved file, whereupon the back linked files are saved. For example, data promotion engine 408 opens "index.htm" HTML document 131 (corresponding to the homepage 100), adds lines of HTML code corresponding to the contextual information that is desired to be promoted to "Cruises" hyperlink 112 on homepage 100, and saves the file. The HTML content of "index.htm" document 131 can then be updated at render time (i.e., at the time the client requests the document from the web server and the web server uploads the document to the client for rendering) by a browser 410. The browser displays the content of the document as rendered homepage 100a, which contains original "Cruises" hyperlink anchor 112, along with filled DICs 412, 414, and 416, which comprise graphical or textual content and are added in proximity to text hyperlink anchor 112. Each of these DICs respectively corresponds to the data content of the corresponding one of DICs 400, 402, and 404.

Under the "render time" scheme, data promotion engine 408 does not promote the contextual information so that it is saved in the referring page (e.g., "index.htm"=0 HTML page 131). Instead, the contextual information is dynamically added to the referring HTML content as the web server uploads the document to the client when the document is requested for rendering by the browser. The browser on the client side can only request and receive HTML content in the form of a file. Therefore, when the file for the display page (the referring document) is requested, data promotion engine 408 adds the contextual information HTML content dynamically in line to the (saved) HTML content of the referring document.

Figure 7A:
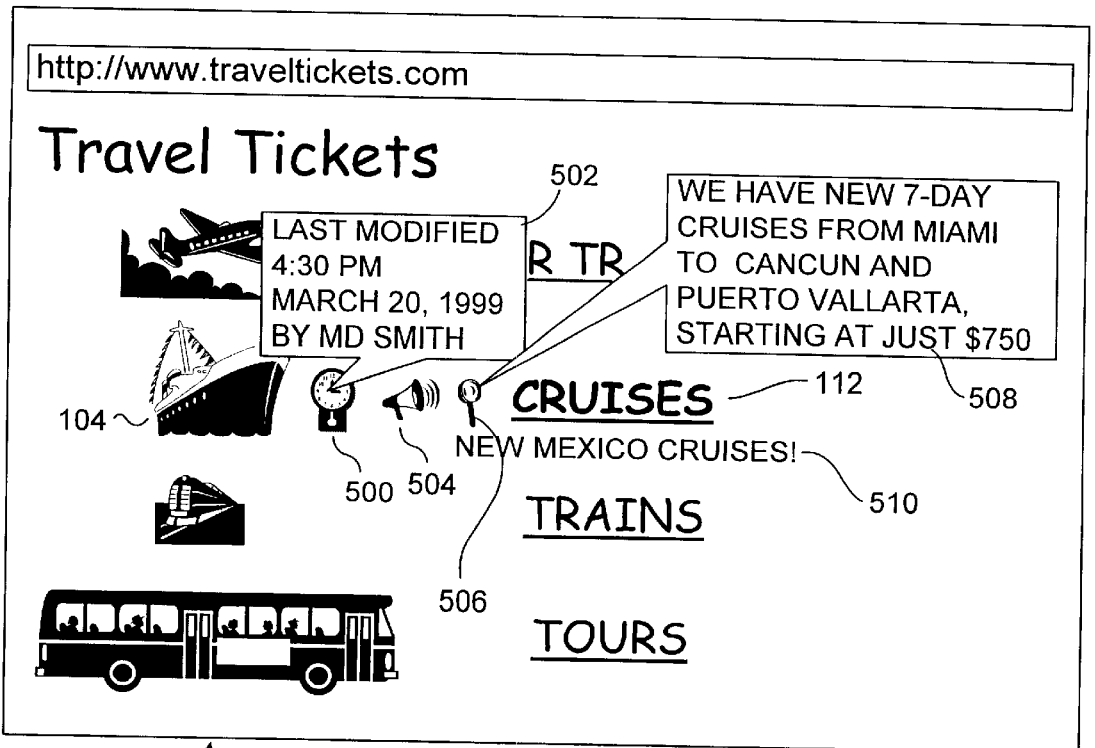
FIG. 7A shows exemplary contextual information corresponding to the Cruises page that can be displayed on the homepage.

A full view of a resultant rendered homepage 100a is shown in FIG. 7A. The contextual information can be displayed as text or as an icon that corresponds to the contextual information, such as to indicate the occurrence of a predefined event. For example, a clock icon 500 can be used to indicate that the document to which the hyperlink is mapped (in this case, the Cruises page) has been changed within a predefined time period, such as within the last 24 hours. The clock icon is used to provide an indication to the user that a recent change has been made to the linked page. If no change was made during this time period, clock icon 500 will not be displayed, and the user will know that there is no need to view the linked document in order to ascertain if a change has been made. The clock icon can also be displayed with a dynamic text box 502, based on a user action, such as placing the cursor over it, clicking on it, right clicking on it, etc. In this example, dynamic text box 502 is used to display contextual information regarding the date and time that the document was last modified, and who made the modification, but it will be apparent that other types of contextual information can be displayed in the same manner.

Other icons can be used to provide the user with other types of information about the linked page. For instance, an announcement megaphone icon 504 is used in the example shown in FIGS. 7A and 7B to indicate that a substantial change has occurred in the linked page, such as the addition of Mexican cruises to the Cruises page. Again, a dynamic text box (not shown) can be displayed based on user interaction with the announcement icon. Another icon that can be used is a magnifying glass icon 506, which the user can select (click on with the cursor) to dynamically display more detailed information about recent changes to the linked page, such as that shown in a dynamic text box 508. Other icons that can be used will be apparent to those skilled in the art of web page design and development.

The decision to promote announcement megaphone 504 can also be based on information provided by the client. For example, information parsed from a history list in the client's browser can be forwarded to the web server identifying the last time that a user viewed a particular document. If the document had been modified since the last viewing, an announcement icon can be promoted to any hyperlinks within the web site that correspond to the previously viewed document. Alternatively, the contextual information HTML content uploaded to the browser at render time can contain date and time modification information instructions that look at the history list and causes indicia to be displayed (such as an icon or text) based on whether the site or page has been changed since the user last visited it.

A "New Mexico Cruises!" text entry 510 is an example illustrating adding contextual information to a hyperlink by using display text. Text entry 510 is preferably displayed when the page is originally rendered, or alternatively, can be displayed based on user interaction with "Cruises" hyperlink anchor 112 or ship picture icon 104.

The contextual information discussed above as provided by any of icons 500, 504, 506 or other icons (not shown) could alternatively be caused to be displayed by user interaction with text hyperlink anchor 112 and/or ship picture icon 104. For example, right clicking on text hyperlink anchor 112 could cause dynamic text box 502 and/or dynamic text box 508 to be displayed. In addition to the examples of contextual information discussed above, a variety of other contextual information can be added to the rendered page, either statically or dynamically, to help the user to decide whether to visit the linked document.

From the user's viewpoint, the "save time" scheme and the "render time" scheme produce a similar result. The HTML content received by the browser in the client computer contains HTML code for the requested document that includes additional code for displaying the contextual information corresponding to the documents that may be viewed via hyperlinks in the displayed document. However, it is preferable to use the "save time" scheme, because this scheme requires less overhead for the server during render time. Additionally, the "save time" scheme supports the ability to promote contextual data for pages that are nested below the linked page, as follows.

Figure 8:
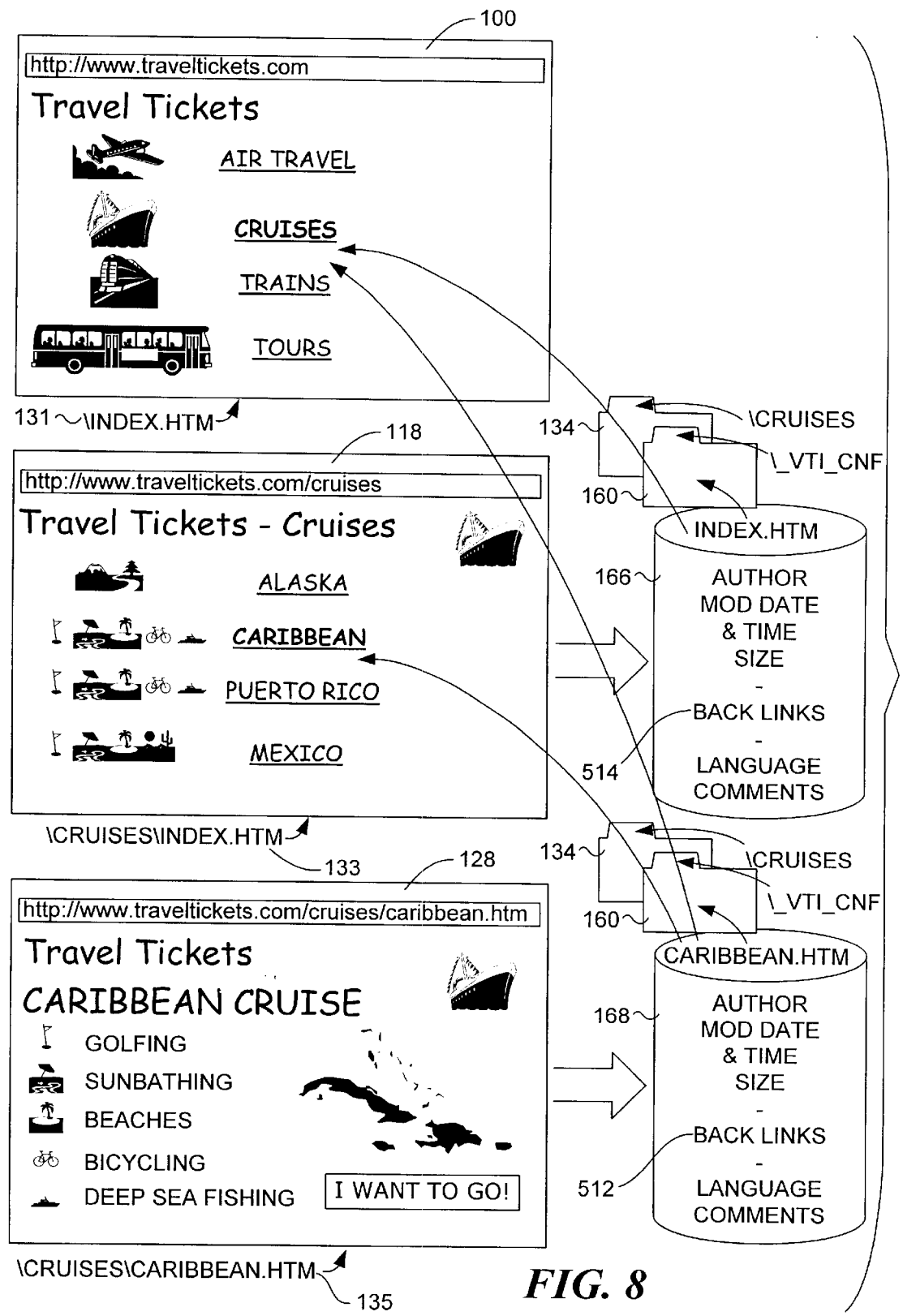
FIG. 8 shows how contextual information concerning a nested page is added to a display page that contains a hyperlink to an intermediate page, which contains a hyperlink to the nested page.

FIG. 8 shows an example of the promotion of contextual data from a nested link. Suppose "Caribbean.htm" HTML document 135 is modified to include information on fishing. When the document is saved, contextual information is stored as meta-data in "caribbean.htm" contextual information file 168. This information can be promoted not only to the referring Cruises page, but also to the homepage. By promoting contextual information from nested pages in this way, the user can be provided with contextual information about changes to nested pages that are disposed below an intermediate document corresponding to a hyperlink contained on the display page. The information that is displayed on homepage 100 (or other page, as applicable) can include contextual information from both the intermediate page (e.g., Cruises page 118), and pages that are linked to the intermediate page (e.g., Caribbean Cruises page 128).

Promotion of data from nested documents is accomplished by recursively following the back link information entries up the chain, and making appropriate changes to the corresponding HTML documents. For instance, "caribbean.htm" contextual information file 168 contains a back link information entry 512 that indicates "index.htm" HTML document 133 (corresponding to the Cruises page) is a referring document. Thus, contextual information can be added to "index.htm" HTML document 133 so that it is displayed in proximity to "Caribbean" text hyperlink anchor 122 on Cruises page 118. In addition, back links 514 of contextual information file 166 are then checked to see if the contextual data for Caribbean Cruise page 128 can be promoted to a page at a higher level, such as homepage 100.

Figure 7B:
FIG. 7B shows exemplary contextual information corresponding to the Caribbean page that can be displayed on the homepage.

FIG. 7B shows an example of contextual information that is promoted from Caribbean Cruise page 128 to homepage 100*b*. Homepage 100*b* now displays a "World-Class Fishing in the Caribbean" text entry 516, under "New Mexico Cruises!" text entry 510. By user interaction with text entry 516, such as by right clicking on it, a dynamic text box 518 can be displayed to provide the user with more information about fishing in the Caribbean.

Another feature of the present invention is the ability to associate category information with design components in web page documents. This feature enables a web page author to insert a category list component in a design page. The category list component is used to automatically generate hyperlinks to various documents based on categorical information pertaining to the hyperlinks. For instance, an author on a bookstore web site may want to insert a category list component into a web page that can be used to automatically generate hyperlinks to various web pages (documents) that describe books corresponding to the year 2000 problem. This can be accomplished by assigning one or more categories to various documents on a site, and inserting a category list component with an associated category into the document that is to contain the hyperlinks to each of the documents of specific categories. The following example explains the process in detail.

Figure 9A:
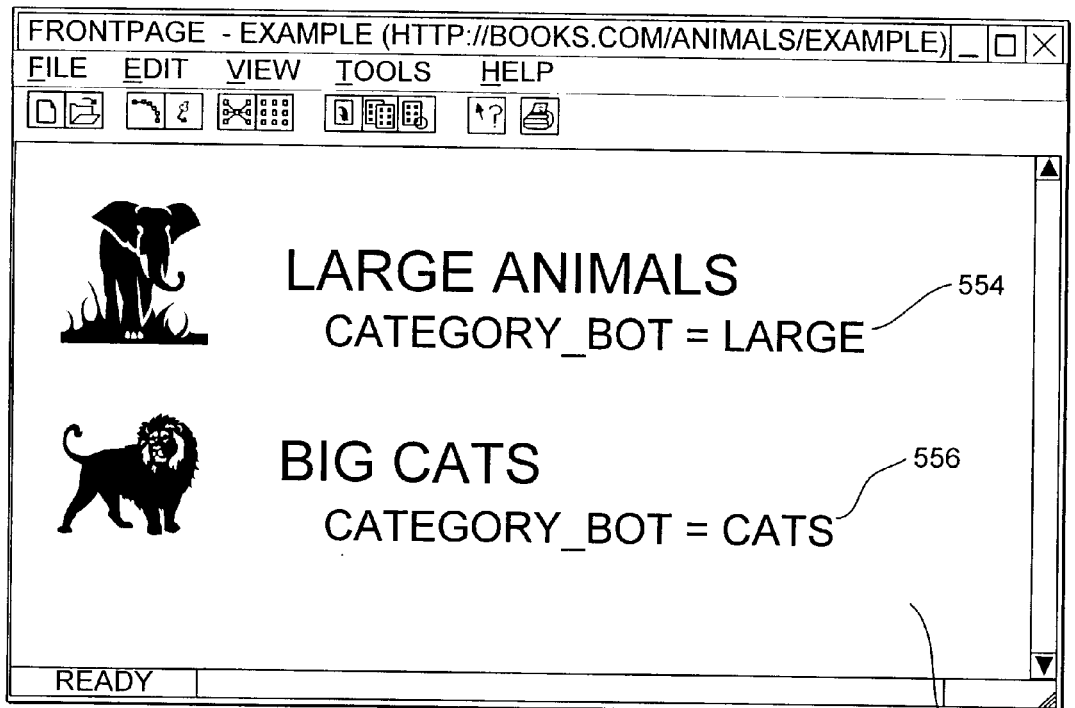
FIG. 9A is an exemplary design page containing two category list components.

FIG. 9A shows a design page 550 in a FRONTPAGE™ page design window 552. In the page design mode, a user can create web pages in a WYSIWYG environment by inserting various components, such as graphics and text, into the design page. In addition, the page design mode provides for insertion of category list components. Each category list component is associated with a "category_bot=" entry. Design page 550 contains two category list components, a "category_bot=large" category list component 554, and a "category_bot=cats" category list component 556. The "category_bot=" entry associates the category list component to a specific author defined 'category'. Thus, category list component 554 is associated with a "large" category, while category list component 556 is associated with a "cats" category.

Figure 9B:
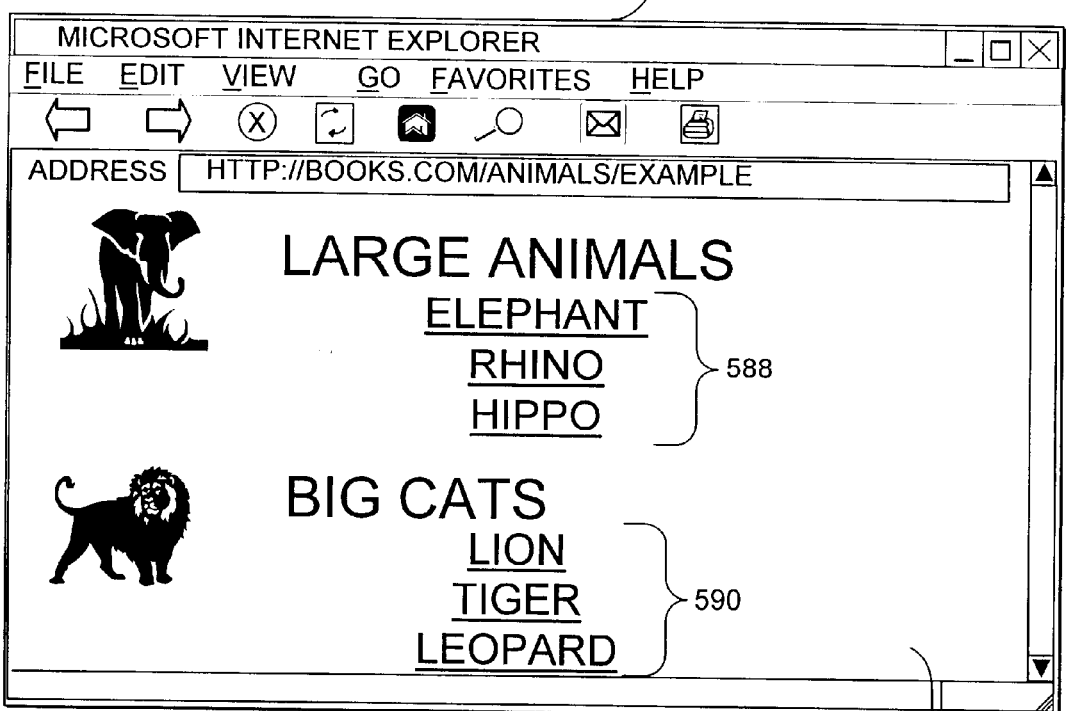
FIG. 9B is a display page corresponding to the design page of FIG. 9A.
Figure 9C:
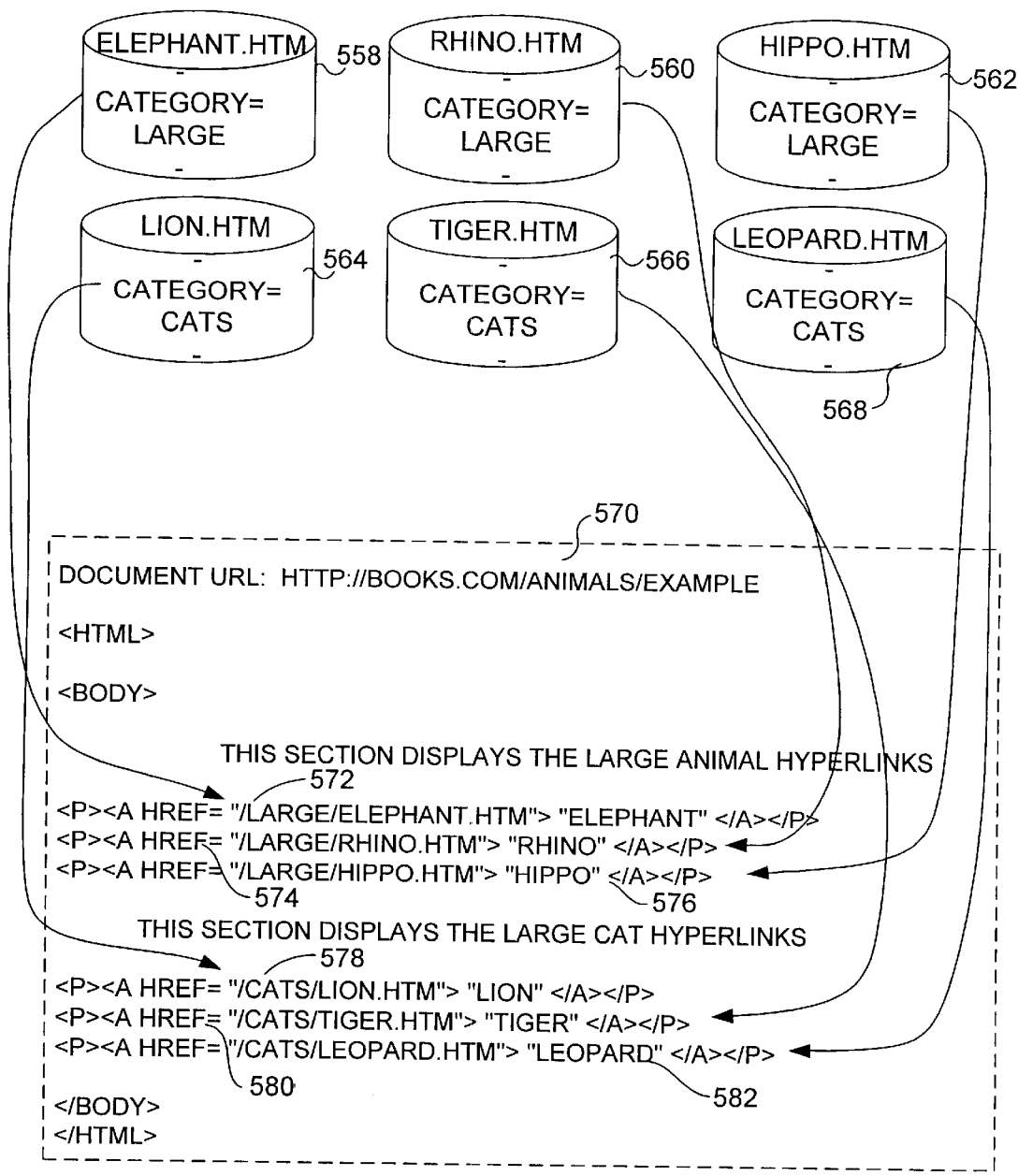
FIG. 9C is a schematic diagram illustrating how hyperlinks are created based on the category information stored in various contextual information files.

The category list components are used to automatically generate a list of one or more hyperlinks to documents on a web that are assigned a category matching the category associated with each category list component. For instance, suppose that a user has created three pages corresponding to the "large" category, including: elephant.htm, rhino.htm, and hippo.htm, and three pages corresponding to the "cats" category, including: lion.htm, tiger.htm, and leopard.htm. Each of these pages has an associated contextual information file containing meta-data entries, as shown in FIG. 9C. These contextual information files include an elephant.htm file 558, rhino.htm file 560, hippo.htm file 562, lion.htm file 564, tiger.htm file 566, and leopard.htm file 568. Each of these contextual information files contains a category metadata entry that is used to assign a category to the page (the HTML document) with which the contextual information file is associated. For example, the "large" category is assigned to the HTML documents (not shown) that are associated with contextual information files 558, 560, and 562, and the "cats" category is assigned to the HTML documents (not shown) that are associated with contextual information files 564, 566, and 568. The category meta-data entries are preferably added to a contextual information file when its associated document is saved, as described above. The categories can be explicitly defined by the user, or implicit as part of some other process (such as a pre-save scan of the document for keywords). A given document may be assigned to one or more categories, or none at all.

When a design page is saved, an HTML document is created (or modified) that contains the HTML code (and JAVA script, as applicable) for displaying the design page on a browser. At this point, the data promotion engine is invoked to generate hyperlinks that correspond to each of the category list components in a given design page. The data promotion engine parses through the content of the design page document in search of category_bot entries. When the data promotion engine comes to a "category_bot" entry, it parses through the contextual information files on the site to identify any documents that are assigned to a category matching the category indicated by the category_bot entry. The data promotion engine then generates the HTML code to insert hyperlinks into the pages that have been assigned to the matching category.

For example, an HTML code listing 570 in the lower portion of FIG. 9C illustrates a partial listing of the code for the HTML document that corresponds to design page 550. When the data promotion engine comes to category list component 554, it parses the contextual information files, searching for files that contain a "category=large" meta-data entry. The data promotion engine keeps a record of the locations of the parent documents (the document to which the contextual information file corresponds) for the contextual files that have a "category=" entry matching the desired category, and generates hypertext link HTML code to create hyperlinks to the parent documents in the design page. For example, a hypertext link 572 contains the HTML code to create a hyperlink to the document "\large\elephant.htm" (using a relative addressing scheme). Hypertext links 574 and 576 correspond to the parent documents of rhino.htm file 560 and hippo.htm file 562, respectively. A similar set of hypertext links 578, 580, and 582 are also created that correspond to category list component 556.

The hyperlinks that are created on the display page (corresponding to the design page) are positioned relative to the location of the category list components on the design page. For example, FIG. 9B shows a display page 584, which corresponds to design page 550, as viewed on a browser 586. Hyperlinks 588 correspond to pages that have been assigned to the "large" category, while the hyperlinks 590 correspond to pages that have been assigned to the "cats" category.

Another feature of the category association scheme is the ability to automatically promote new hyperlinks to design pages when new pages are created and (or existing pages are) assigned to categories that correspond to category list components in the design page, without requiring the design page to be edited by a user so as to include the new hyperlinks. When a new page is created and saved, its author has the option of assigning a category to it. Alternately, an author can assign a category to an existing page or modify the category already assigned to an existing page. If a category is assigned to the new or existing page, the category information is stored as a meta-data entry in the contextual information file associated with the new or existing page, and the data promotion engine then parses through all of the documents on the site in search of documents that contain a category list component matching the category of the new document. The data promotion engine opens the matching files and adds HTML code to these files to add a hyperlink to the new or existing document.

The category association scheme also allows web pages to be related by category information, thereby enabling a web site author to easily identify some or all of the documents that correspond to a specific category based on the category entry in the contextual information.

Exemplary Operating Environment

Figure 10:
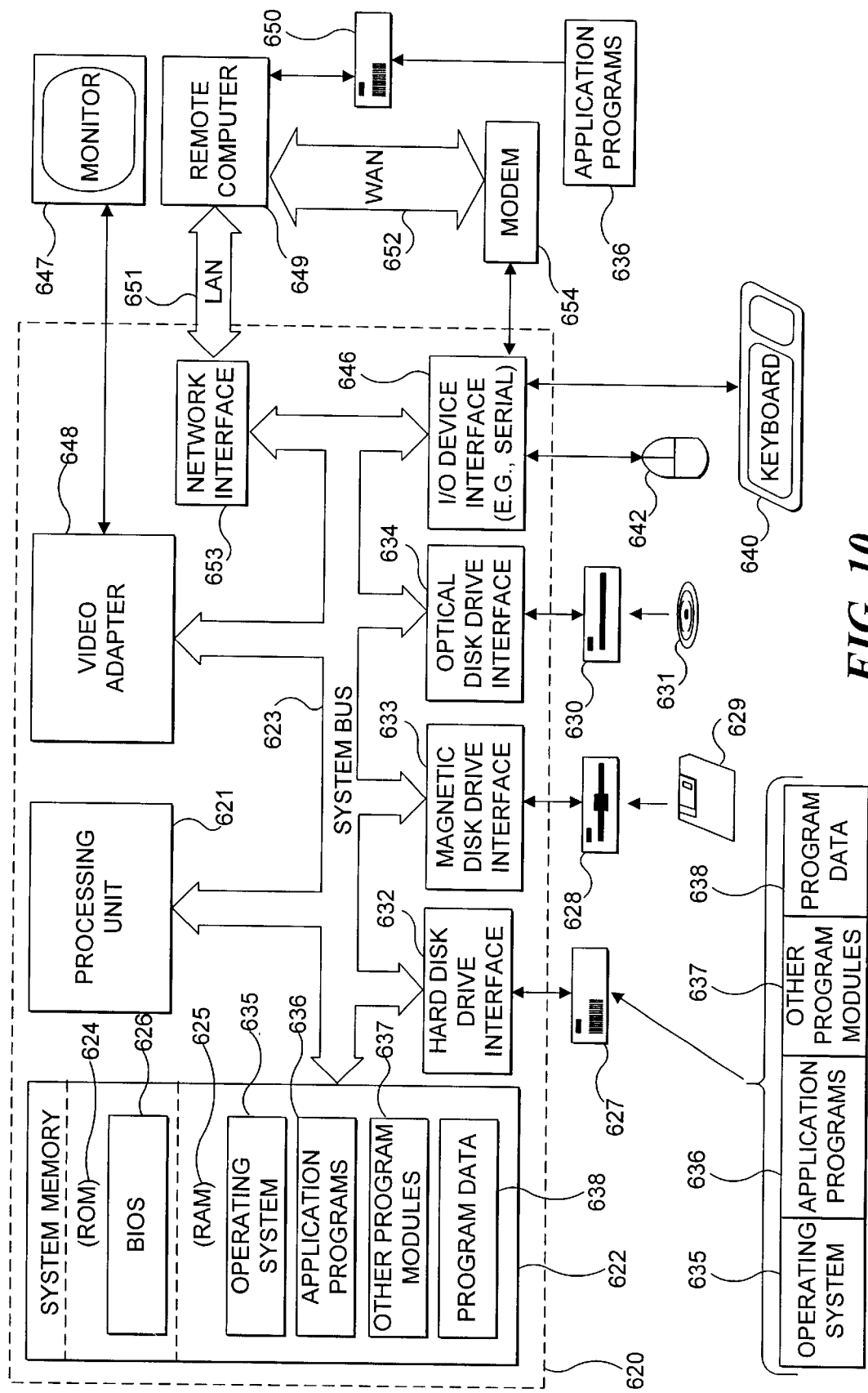
FIG. 10 is a block diagram of a personal computer system suitable for implementing the present invention.

FIG. 10 and the following discussion are intended to provide a brief, general description of a suitable computing environment in which the invention may be implemented. The present invention preferably is implemented as part of an application program in a web authoring environment, wherein the application program is executed by a personal computer or workstation. The application program comprises a plurality of program modules that include routines, programs, objects, components, and data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 10, an exemplary system for implementing the invention (as either the client computer or the server computer) includes a general purpose computing device in the form of a conventional personal computer 620, including a processing unit 621, a system memory 622, and a system bus 623 that couples various system components including the system memory to processing unit 621. System bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that helps to transfer information between elements within personal computer 620, such as during start-up, is stored in ROM 624. Personal computer 620 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD-ROM or other optical media. Hard disk drive 627, magnetic disk drive 628, and optical disk drive 630 are connected to system bus 623 by a hard disk drive interface 632, a magnetic disk drive interface 633, and an optical disk drive interface 634, respectively. The drives and their associated computer readable media provide nonvolatile storage of computer readable instructions, data structures, program modules, and other data for personal computer 620. Although the exemplary environment described herein employs a hard disk, removable magnetic disk 629, and removable optical disk 631, it should be appreciated by those skilled in the art that other types of computer readable media which can store data that is accessible by a computer, such as magnetic cassettes, flash memory cards, digital video disks, Bernoulli cartridges, RAMs, ROMs, and the like may also be used in the exemplary operating environment.

A number of program modules may be stored on the hard disk, magnetic disk 629, optical disk 631, ROM 624, or RAM 625, including an operating system 635, one or more application programs 636, other program modules 637, and program data 638. A user may enter commands and information into personal computer 620 through input devices such as a keyboard 640 and a pointing device 642. Other input devices (not shown) may include a microphone, joystick, game pad, satellite dish, scanner, or the like. These and other input devices are often connected to processing unit 621 through a serial port interface 646 that is coupled to the system bus, but may be connected by other interfaces, such as a parallel port, game port, or a universal serial bus (USB). A monitor 647 or other type of display device is also connected to system bus 623 via an interface, such as a video adapter 648. In addition to the monitor, personal computers typically include other peripheral output devices (not shown), such as speakers and printers.

Personal computer 620 may operate in a networked environment using logical connections to one or more remote computers, such as a remote computer 649. Remote computer 649 may be another personal computer, a server, a router, a network PC, a peer device, or other common network node, and typically includes many or all of the elements described above relative to personal computer 620, although only a memory storage device 650 has been illustrated in FIG. 10. The logical connections depicted in FIG. 10 include a local area network (LAN) 651 and a wide area network (WAN) 652. Such networking environments are commonplace in offices, enterprise-wide computer networks, intranets, and the Internet.

When used in a LAN networking environment, personal computer 620 is connected to LAN 651 through a network interface or adapter 653. When used in a WAN networking environment, persona! computer 620 typically includes a modem 654 or other means for establishing communications over WAN 652, such as the Internet. Modem 654, which may be internal or external, is connected to system bus 623 via serial port interface 646. In a networked environment, program modules depicted relative to personal computer 620, or portions thereof, may be stored in the remote memory storage device. It will be appreciated that the network connections shown are exemplary and other means of establishing a communications link between the computers may be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for promoting contextual information pertaining to a linked document to a display page containing a hyperlink to the linked document, wherein the contextual information comprises more information pertaining to the linked document than the hyperlink contained in the display page and the display page being viewable on a browser, which is capable of displaying the contextual information, comprising the steps of:
   (a) editing the linked document so that at least one parameter of the linked document has been changed, producing an edited linked document;
   (b) storing the edited linked document on a server;
   (c) generating meta-data that references said at least one changed parameter of the linked document;
   (d) storing the meta-data on the server;
   (e) determining the contextual information from the stored meta-data, wherein the contextual information comprises more information pertaining to the linked document than the hyperlink contained in the display page; and
   (f) automatically generating instructions for displaying in the display page the contextual information pertaining to the linked document, the instructions thus generated defining a part of the display page and being uploaded from the server to the browser so as to enable display of the contextual information pertaining to the linked document on the display page when the display page is viewed on the browser.

2. The method of claim 1, wherein the contextual information indicates that the linked document has been changed within a predefined time interval prior to the display page being viewed on the browser.

3. The method of claim 1, wherein the hyperlink has an anchor, further comprising the step of selectively displaying at least a portion of the contextual information in response to a user interaction with the anchor.

4. The method of claim 1, further comprising the steps of:
   (a) displaying an icon on the browser when the display page is viewed, said icon representing a portion of the contextual information; and
   (b) selectively displaying another portion of the contextual information on the browser while the display page is being viewed, in response to a user interaction with the icon.

5. The method of claim 1, wherein the meta-data are stored in a file that is separate from the linked document.

6. The method of claim 1, wherein the browser stores a history indicating a most recent time a user of the browser has viewed the linked document, further comprising the step of indicating on the display page whether the linked document has been changed since the most recent time the linked document was viewed.

7. The method of claim 1, wherein the contextual information includes a date and a time that the linked document was last edited.

8. The method of claim 1, wherein the linked document contains a hyperlink to a nested document that has been edited and stored on the server, the nested document being associated with additional meta-data stored on the server concerning parameters of the nested document, further comprising the step of adding a reference to the additional meta-data in the contextual information that is available to be viewed when the display page is viewed on the browser.

9. The method of claim 1, wherein a portion of the instructions is written in Hyper Text Markup Language.

10. The method of claim 1, wherein a portion of the instructions is written in JAVA script.

11. The method of claim 1, wherein the meta-data include a comment made by an author of the linked document, and wherein the contextual information includes the comment by the author.

12. The method of claim 1, wherein the meta-data include a size of the linked document, and wherein the contextual information viewable on the display page includes the size of the linked document.

13. A computer readable medium having computer executable instructions for promoting contextual information pertaining to a linked document to a display page containing a hyperlink to the linked document, wherein the contextual information comprises more information pertaining to the linked document than the hyperlink contained in the display page and the display page being viewable on a browser, which is capable of displaying the contextual information by carrying out a plurality of functions, including:
   (a) editing the linked document so that at least one parameter of the linked document has been changed, producing an edited linked document;
   (b) storing the edited linked document on a server;

(c) generating meta-data that references said at least one changed parameter of the linked document;

(d) storing the meta-data on the server;

(e) determining the contextual information associated with the linked document from the stored meta-data, wherein the contextual information comprises more information pertaining to the linked document than the hyperlink contained in the display page; and (f) automatically generating instructions for displaying in the display page the contextual information pertaining to the linked document, the instructions thus generated defining a part of the display page and being uploaded from the server to the browser so as to enable display of the contextual information pertaining to the linked document on the display page when the display page is viewed on the browser.

14. The computer readable medium of claim 13, wherein the plurality of functions further include:

(a) displaying an icon on the browser when the display page is viewed, said icon representing a portion of the contextual information; and (b) selectively displaying another portion of the contextual information on the browser while the display page is being viewed, in response to a user interaction with the icon.

15. A method for promoting contextual information pertaining to a linked document to a referring document having a hyperlink to the linked document, wherein the contextual information comprises more information pertaining to the linked document than the hynerlink contained in the referring document, and the referring document comprising instructions that are stored on a server and interpreted by a browser to render a display page on a client, comprising the steps of:

(a) changing at least one parameter of the linked document to produce an edited linked document;

(b) storing the edited linked document on the server;

(c) generating meta-data referencing said at least one parameter of the edited linked document that was changed;

(d) storing the meta-data on the server;

(e) automatically generating display code that causes contextual information corresponding to the meta-data to be viewable on the display page rendered by the browser, wherein the contextual information comprises more information pertaining to the linked document than the hyperlink displayed in the display page; and (f) adding the display code to the instructions comprising the referring document and saving the referring document, the display code being interpreted by the browser when the display page is rendered to enable at least a portion of the contextual information pertaining to the linked document to be viewed on the display page.

16. The method of claim 15, wherein the contextual information indicates that the linked document has been changed within a predefined time interval prior to the browser rendering the display page.

17. The method of claim 15, wherein the hyperlink has an anchor, further comprising the step of selectively displaying at least a portion of the contextual information in response to a user interaction with the anchor of the hyperlink.

18. The method of claim 15, further comprising the steps of:

(a) displaying an icon representing a portion of the contextual information when the browser renders the display page; and (b) selectively displaying another portion of the contextual information in response to a user interaction with the icon.

19. The method of claim 15, wherein the meta-data are stored in a file that is separate from the linked document.

20. The method of claim 15, wherein the browser stores a history indicating a most recent time a user of the browser has viewed the linked document, further comprising the step of indicating on the display page whether the linked document has been changed since the most recent time the linked document was last viewed on the browser.

21. The method of claim 15, wherein the contextual information includes a date and a time that the linked document was last edited.

22. The method of claim 15, wherein the linked document contains a hyperlink to a nested document that has been edited and stored on the server, the nested document being associated with additional meta-data stored on the server referencing parameters of the nested document, further comprising the step of adding display code to the referring document so that the display page includes contextual information referring to the additional meta-data.

23. The method of claim 15, wherein a portion of the instructions is written in Hyper Text Markup Language.

24. The method of claim 15, wherein a portion of the instructions is written in JAVA script.

25. A computer readable medium having computer executable instructions for promoting contextual information pertaining to a linked document to a referring document having a hyperlink to the linked document, wherein the contextual information comprises more information pertaining to the linked document than the hyperlink contained in the referring document and the referring document comprising instructions that are stored on a server and interpreted by a browser to render a display page on a client, said computer executable instructions causing a plurality of functions to be carried out, including:

(a) changing at least one parameter of the linked document to produce an edited linked document;

(b) storing the edited linked document on the server;

(c) generating meta-data referencing said at least one parameter of the edited linked document that was changed;

(d) storing the meta-data on the server;

(e) automatically generating display code that causes contextual information corresponding to the meta-data to be viewable on the display page rendered by the browser, wherein the contextual information comprises more information pertaining to the linked document than the hyperlink displayed in the display page; and (f) adding the display code to the instructions comprising the referring document and saving the referring document, the display code being interpreted by the browser when the display page is rendered to enable at least a portion of the contextual information pertaining to the linked document to be viewed on the display page.

26. The computer readable medium of claim 25, wherein the plurality of functions further includes:

(a) displaying an icon representing a portion of the contextual information when the browser renders the display page; and (b) selectively displaying another portion of the contextual information in response to a user interaction with the icon.

27. A method for promoting contextual information pertaining to a nested document to a display page document, wherein the contextual information comprises more information pertaining to the nested document than the hyperlink contained in the display page, and the display page document having a hyperlink to an intermediate document, the intermediate document having a hyperlink to the nested document, the display page document comprising instructions that are stored on a server and are executed by a browser render a display page, comprising the steps of:

(a) changing at least one parameter of the linked document, producing an edited nested document;

(b) storing the edited nested document on the server;

(c) generating meta-data referencing said at least one parameter of the nested document that was changed;

(d) storing the meta-data on the server in a location associated with the edited linked document so as to be accessible by reference to the edited linked document, without reference to a centralized database;

(e) automatically generating code enabling contextual information referring to the meta-data to be viewable when the browser renders the display page, wherein the contextual information comprises more information pertaining to the linked document than the hyperlink displayed in the display page; and (f) adding the display code to the instructions for rendering the display page document, the added contextual information code being employed by the browser to enable the contextual information concerning said at least one changed parameter of the nested document to be viewed when rendering the display page.

28. The method of claim 27, wherein meta-data associated with the linked document are generated and stored on the server, said meta-data including back link information identifying the display page that contains the hyperlink to the intermediate document.

29. The method of claim 27, wherein the display page includes both contextual information concerning the nested document and contextual information concerning the intermediate document.

30. A computer readable medium having computer executable instructions for promoting contextual information pertaining to a nested document to a display page document, wherein the contextual information comprises more information pertaining to the nested document than the hyperlink contained in the display page and the display page document having a hyperlink to an intermediate document, the intermediate document having a hyperlink to the nested document, the display page document comprising instructions that are stored on a server and are executed by a browser to render a display page, said computer executable instructions causing a plurality of functions to be carried out, including:

(a) changing at least one parameter of the linked document, producing an edited nested document;

(b) storing the edited nested document on the server;

(c) generating meta-data referencing said at least one parameter of the nested document that was changed;

(d) storing the meta-data on the server in a location associated with the edited linked document so as to be accessible by reference to the edited linked document, without reference to a centralized database;

(e) automatically generating code enabling contextual information referring to the meta-data to be viewable when the browser renders the display page, wherein the contextual information comprises more information pertaining to the linked document than the hyperlink displayed in the display page; and (f) adding the display code to the instructions for rendering the display page document, the added contextual information code being employed by the browser to enable the contextual information concerning said at least one changed parameter of the nested document to be viewed when rendering the display page.

* * * * *